(12) United States Patent
Slowik et al.

(10) Patent No.: US 6,311,900 B1
(45) Date of Patent: Nov. 6, 2001

(54) PROCEDURE AND INJECTION NOZZLE FOR INJECTING FUEL, IN PARTICULAR INTO THE COMBUSTION CHAMBER OF AN INTERNAL COMBUSTION ENGINE

(76) Inventors: Günter Slowik, Gotthardstrasse 2, D-06217 Merseburg; Jürgen Kohlmann, Am Weinbergsrain 24, D-06217 Geusa, both of (DE)

( * ) Notice: Subject to any disclaimer, the term of this patent is extended or adjusted under 35 U.S.C. 154(b) by 0 days.

(21) Appl. No.: 09/530,697

(22) PCT Filed: Nov. 2, 1998

(86) PCT No.: PCT/DE98/03198

§ 371 Date: May 3, 2000

§ 102(e) Date: May 3, 2000

(87) PCT Pub. No.: WO99/23383

PCT Pub. Date: May 14, 1999

(30) Foreign Application Priority Data

Nov. 3, 1997  (DE) .............................................. 197 48 384
Aug. 5, 1998  (DE) .............................................. 198 35 340

(51) Int. Cl.$^7$ ................. B05B 1/34; B05B 1/30; F02M 61/00

(52) U.S. Cl. ................. 239/533.12; 239/491; 239/585.1

(58) Field of Search ............................. 239/491, 533.12, 239/574, 585.1, 585.3, 585.4, 585.5, 585.2; 137/599.05

(56) References Cited

U.S. PATENT DOCUMENTS

| | | | |
|---|---|---|---|
| 4,179,069 | * 12/1979 | Knapp et al. | 239/491 |
| 4,235,375 | * 11/1980 | Melotti | 239/125 |
| 4,292,947 | * 10/1981 | Tanasawa et al. | 123/445 |
| 4,365,746 | * 12/1982 | Tanasawa et al. | 239/125 |
| 4,374,785 | * 2/1983 | Wyatt | 137/599.05 |
| 4,394,856 | * 7/1983 | Smith et al. | 239/585.1 |
| 4,522,172 | * 6/1985 | Oshima et al. | 123/276 |
| 4,805,837 | * 2/1989 | Brooks et al. | 239/463 |
| 5,170,945 | * 12/1992 | Daly et al. | 239/585.4 |
| 5,307,997 | * 5/1994 | Wakeman | 239/491 |
| 5,713,326 | * 2/1998 | Huber | 123/299 |

FOREIGN PATENT DOCUMENTS

| | | |
|---|---|---|
| 24 60 111 | * 7/1976 | (DE) . |
| 28 07 345 | * 8/1978 | (DE) . |
| 27 25 135 | * 12/1978 | (DE) . |
| 86 08 650 | * 9/1997 | (DE) . |
| 0 200 865 | * 2/1989 | (EP) . |
| 62-139971 | * 6/1987 | (JP) . |

* cited by examiner

Primary Examiner—David A. Scherbel
Assistant Examiner—Davis Hwu (57) ABSTRACT

Given the disadvantages inherent in known prior art, the object is to create a procedure and suitable injection nozzle to achieve a rotationally symmetric distribution of fuel during entry into the combustion chamber. In addition, the object is to achieve a high atomization quality, in particular at the start of the injection process already, an optimal injection progression while the nozzle opens, and a variation in injection quantity.

To achieve this object, it is proposed that the fuel be introduced into the swirl chamber where its radius is largest. While the nozzle outlet opening is closed, a radial velocity component directed toward the axis of the swirl chamber is imparted to the fuel flow to go along with the peripheral velocity component. The fuel flow is removed from the swirl chamber where its radius is smallest, concentrically to the valve needle, wherein the removal of fuel from the swirl chamber is slowed or completely interrupted during the injection phase.

23 Claims, 10 Drawing Sheets

PROCEDURE AND INJECTION NOZZLE FOR INJECTING FUEL, IN PARTICULAR INTO THE COMBUSTION CHAMBER OF AN INTERNAL COMBUSTION ENGINE

BACKGROUND OF THE INVENTION

1. Field of the Invention

The invention relates to a procedure for injecting fuel in particular into the combustion chamber of internal combustion engines via a swirl injection nozzle with axially movable valve needle, wherein the pressurized supplied fuel is made to rotate around the valve needle in an annular swirl chamber arranged in front of the outlet nozzle. The invention also relates to an injection nozzle suitable for executing the procedure.

2. The Prior Art

Numerous procedures and devices are already known for injecting fuel directly into the combustion chamber of both diesel and Otto engines. The fuel is injected into the combustion chamber of the engine and atomized via a pump-nozzle system or a pump-line-nozzle system (common-rail system) during compression. The injection process can also take place in several phases, so-called, pre- and main injection. One significant feature shared by these injection systems is that atomization takes place from the rest phase of the liquid. In a period measuring in the milliseconds, the potential energy is used for conversion into kinetic energy (fuel velocity), and the low quantity of fuel is atomized to the nozzle outlet opening.

DE-OS 24 60 111 already discloses a generic injection nozzle for injecting a liquid in a chamber subjected to pressure fluctuations during a low-pressure phase.

The supplied fuel enters an annular chamber arranged around the nozzle needle guide, and from the latter via tangential inflow openings at the end of the nozzle needle guide into an annular swirl chamber, which is arranged around the nozzle needle. An annular flow is built up inside the swirl chamber, and stored therein. Given a higher volume of the swirl chamber, the rotational effect can be amplified even further by arranging at least one reflux opening in the swirl chamber, which preferably connects to the swirl chamber in a roughly tangential manner, and is located at the top end of the annular chamber in the nozzle needle guide. The tangential inflow opening and tangential reflux opening are arranged opposite relative to the direction of flow. As indicated in this publication, the fuel is to be intermediately stored rotating in the swirl chamber. Intermediate storage is only on hand if the reflux opening is also closed at least with the nozzle outlet opening closed. As a consequence, the rotational velocity decreases during intermediate storage. During the ejection process, the flow of fuel divides into two partial streams with the reflux opening open, wherein the upwardly directed partial current generates swirls in the direction of the reflux opening that have a negative effect on the atomization quality.

Also known is an electromagnetic fuel injection valve for internal combustion engines (U.S. Pat. No. 4,179,069), which is intended in particular for the injection of fuel into the suction pipe of a vehicle motor. The fuel is injected via a swirl injection nozzle with axially moveable valve needle, wherein the pressurized fuel is made to rotate around the valve needle in an annular swirl chamber arranged directly in front of the outlet nozzle, and the fuel is introduced into the swirl chamber at its largest radius through a fuel inlet line that generates the peripheral velocity component. The fuel flow is removed where the radius of the swirl chamber is narrowest, concentrically to the valve needle. During the injection phase, removal of the fuel from the swirl chamber is interrupted.

A procedure for injecting fuel via a swirl injection nozzle with axially moveable valve needle is also known from U.S. Pat. No. 4,805,837. An annular swirl chamber is arranged directly in front of the outlet opening of the nozzle. The fuel is introduced into the swirl chamber at its largest radius, and removed concentrically to the valve needle where the radius of the swirl chamber is narrowest with the outlet opening closed. During the injection phase, removal of the fuel is interrupted.

The disadvantage to the known injection procedures mentioned above is generally that the injection quantity for achieving an optimal injection progression cannot be varied sufficiently, and the achievable atomization quality does not reflect the set high requirements.

SUMMARY OF THE INVENTION

The object of the invention was to develop a procedure for injecting fuel, in particular into the combustion chamber, of internal combustion engines, which makes it possible to achieve a rotationally symmetric distribution of fuel during entry into the combustion chamber, which ensures a high atomization quality, in particular as the injection process starts out already, along with an optimal injection progression while the nozzle outlet opening is open, and which makes it possible to vary the injection quantity at the same preliminary pressure and constant opening time for the valve needle.

In addition, the object is to provide an injection nozzle that is inexpensive to manufacture and suitable for executing the procedure.

The fuel is introduced into the swirl chamber where its radius is largest, preferably through channels running tangentially or inclined from top to bottom, and removed form the swirl chamber where its radius is smallest concentrically to the valve needle with the nozzle outlet opening closed. The fuel introduced into the swirl chamber is therein subjected to a nearly level, rotationally symmetric flow progression. In addition to the peripheral velocity component, this flow also exhibits a radial component directed toward the vertical axis of the swirl chamber, and hence toward the valve needle, wherein the axial velocity component is negligible.

To inject the fuel into the combustion chamber, the valve needle is opened, and the reflux quantity of the fuel is partially or completely throttled out of the swirl chamber at the same time. The fuel is not injected into the combustion chamber at rest, but under conditions of an already existing kinetic energy owing to the applied rotational velocity via the delivery pressure of the pump formed at the time of injection. Since the flow progression of the rotating fuel is already directed toward the nozzle needle right at the time of injection into the combustion chamber, is not subject to any additional change in direction in the swirl chamber by the opening of the nozzle needle, an improved atomization quality is achieved. In addition, the fuel flow already possesses a high kinetic energy at this time. The proposed procedure is suitable for injection systems with continuously or discontinuously operating injection pumps, and for so-called common-rail systems. The fuel rotating in the swirl chamber should preferably execute at least one complete rotational motion around the valve needle before the injection process is initiated. This ensures a particularly high atomization quality.

According to the procedure, the injection process can be controlled by varying both the fuel fed into the swirl chamber, and the fuel removed form the swirl chamber.

The fuel can be introduced into the swirl chamber through several entry opening s or channels with identical or varying cross-sectional surfaces, wherein the respective partial fuel quantities can also vary. An additional varying time controller can be used for a so-called pre and main injection. To achieve the desired rotation of the fuel inside the swirl chamber, the fuel must be introduced into the swirl chamber via an inlet line running tangentially or inclined from top to bottom.

The reflux or removal of the fuel from the swirl chamber can take place in several phases, whose chronological sequence can be varyingly controlled, so that different partial quantities flow out at defined points in time. In the pump-nozzle system, it makes sense to control the change in cross section of the outlet opening inside the injection nozzle via the movement progression of the valve needle. Various injection quantities can be realized according to the procedure as follows, with the preliminary pressure remaining constant and the valve needle releasing the nozzle outlet opening at the same respective time. Setting the reflux quantity from the swirl chamber makes it possible to simultaneously set the quantity actually to be injected, at the same fuel quantity being conveyed into the swirl chamber. Another preferred possibility involves dividing the fuel supplied to the swirl chamber into two partial flows in front of the swirl chamber that can be set independently of each other. Therefore, varying injection quantities can be realized without changing the reflux quantity. When supplying the fuel via two identical partial flows, one partial flow can be blocked off at the same preliminary pressure, so that only half the fuel quantity can now get into the swirl chamber and be injected into the combustion chamber. As these configurations show, the procedure according to the invention enables numerous ways to influence the injected fuel quantity.

Another step proposed in particular to improve the atomization quality at the beginning of the injection process is to remove the fuel to be drained from the swirl chamber with the nozzle outlet opening closed concentrically directly around the valve needle in the injection direction. As a result, the fuel executes a rotational motion at a very high velocity when the valve needle is opened, and its direction of flow is already directed toward the nozzle outlet opening. Therefore, a fuel flow with a very high rotational velocity is always present in the annular channel running concentrically around the valve needle in the injection direction, regardless of the opening and closing procedure. The excess fuel is radially removed, and then gets into the conventional removal system inside the injection nozzle via channels running opposite the injection direction.

During realization of the procedure inside a common-rail system, a valve whose controller enables the removal of varying fuel quantities is built into the reflux line leading to the fuel. The fuel is supplied via two separate lines with controllable valves. The advantage to proceeding according to the invention inside a common-rail system is primarily that the pressure surge active in this system is reduced, since a valve is always open, either the valve needle while injecting the fuel into the combustion chamber, or the valve in the reflux line with the nozzle outlet opening closed.

An advantageous further configuration of the procedure involves using the respective partial flow quantities of the injected fuel and/or fuel removed from the swirl chamber as a correcting variable for controlling various target parameters, e.g., exhaust quality.

The injection nozzle proposed for executing the procedure exhibits a swirl chamber, whose outside diameter exceeds the height of the swirl chamber, wherein the ratio of outside diameter to height should preferably be greater than 2:1. An advantageous flow progression in the swirl chamber is ensured, for example, when the height of the swirl chamber does not exceed the largest diameter of the supply channels incorporated in the sleeve by more than 10%. It is also important that the system for removing the fuel from the swirl chamber is arranged concentrically around the valve needle. The progression of channels for supplying the fuel into the swirl chamber and removing it from the swirl chamber can be resolved in various ways. In a particularly suitable configuration, the valve needle guide is designed as a sleeve, and the swirl chamber is incorporated at the outlet-side end of the sleeve. The fuel is supplied via axial channels between the sleeve and the nozzle body, as well as via channels incorporated in the sleeve running tangentially or inclined from top to bottom, which empty out in the swirl chamber. An annular gap through which the fuel can flow out of the swirl chamber is arranged in the upper part of the swirl chamber around the journal of the valve needle.

The atomization quality at the beginning of the injection process is improved by providing an annular chamber for structural reasons for radial removal. This chamber can be incorporated in the sleeve or the outlet-side area of the nozzle body, or in both components. It is important that the annular chamber exhibit only a small height, not be higher than the swirl chamber, and be arranged only at a slight axial distance from the swirl chamber, since the additional arrangement of the annular chamber can only lengthen the flow path from the swirl chamber to the nozzle outlet opening to a limited extent. The fuel can reduce its rotational velocity inside the annular chamber, and then be returned to the storage tank via the corresponding channels.

To open and close the flow line in the pump-nozzle system, the upper part of the sleeve has a radial hole, whose opening is released or closed by the motion of the valve needle. The proposed injection nozzle is characterized by a simple structural design, and is inexpensive to manufacture.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the views.

DETAILED DESCRIPTION OF THE PREFERRED EMBODIMENT

The injection nozzles shown in the drawing are shown only in simplified form. All additional components of the injection nozzles not depicted are known prior art.

Figure 1:
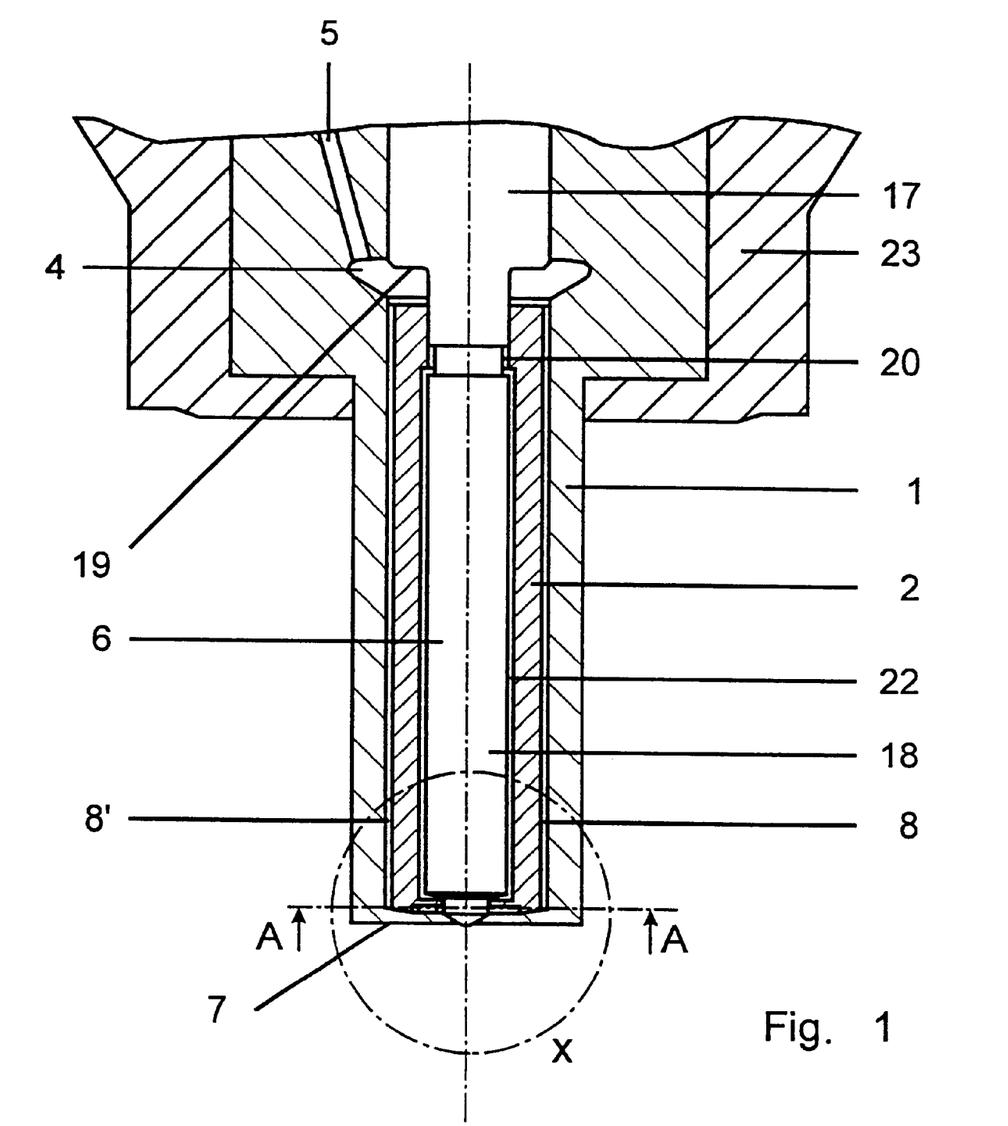
FIG. 1 an injection nozzle according to the invention of a pump-nozzle system, longitudinal section, FIG. 2 a section of the injection nozzle in FIG. 1 rotated by 90° around the longitudinal axis, FIG. 3 a section according to line B—B in FIG. 2, FIG. 4 a magnified view of component X in FIG. 1, FIG. 5 a section according to line C—C in FIG. 4, FIG. 6 another potential configuration of the injection nozzle according to the invention of a pump-nozzle system, longitudinal section, FIG. 7 a section according to line D—D in FIG. 6, FIG. 8 the curve progression for local peripheral velocity in the swirl chamber as a function of time elapsed between the begin and end conveyance phases for the injection nozzle of a pump-nozzle system, FIG. 9 another potential configuration of the injection nozzle according to the invention of a pump-nozzle system with a supply channel running at an inclination, longitudinal section, FIG. 10 a section of the injection nozzle according to FIG. 9 rotated by 90° around the longitudinal axis, FIG. 11 a section according to line F—F in FIG. 9, FIG. 12 an injection nozzle according to the invention for a common-rail system, longitudinal section, FIG. 13 a section according to line E—E in FIG. 12, FIG. 14 a logic diagram for the control progression of an injection nozzle according to FIG. 12 and FIG. 15, FIG. 15 another potential configuration of an injection nozzle for a common-rail system, longitudinal section, FIG. 16 a section according to line G—G in FIG. 14, FIG. 17 a partial area of an injection nozzle of a pump-nozzle system for another potential configuration for removing this fuel from the swirl chamber, longitudinal section, and FIG. 18 a section according to line A—A in FIG. 17.
Figure 2:
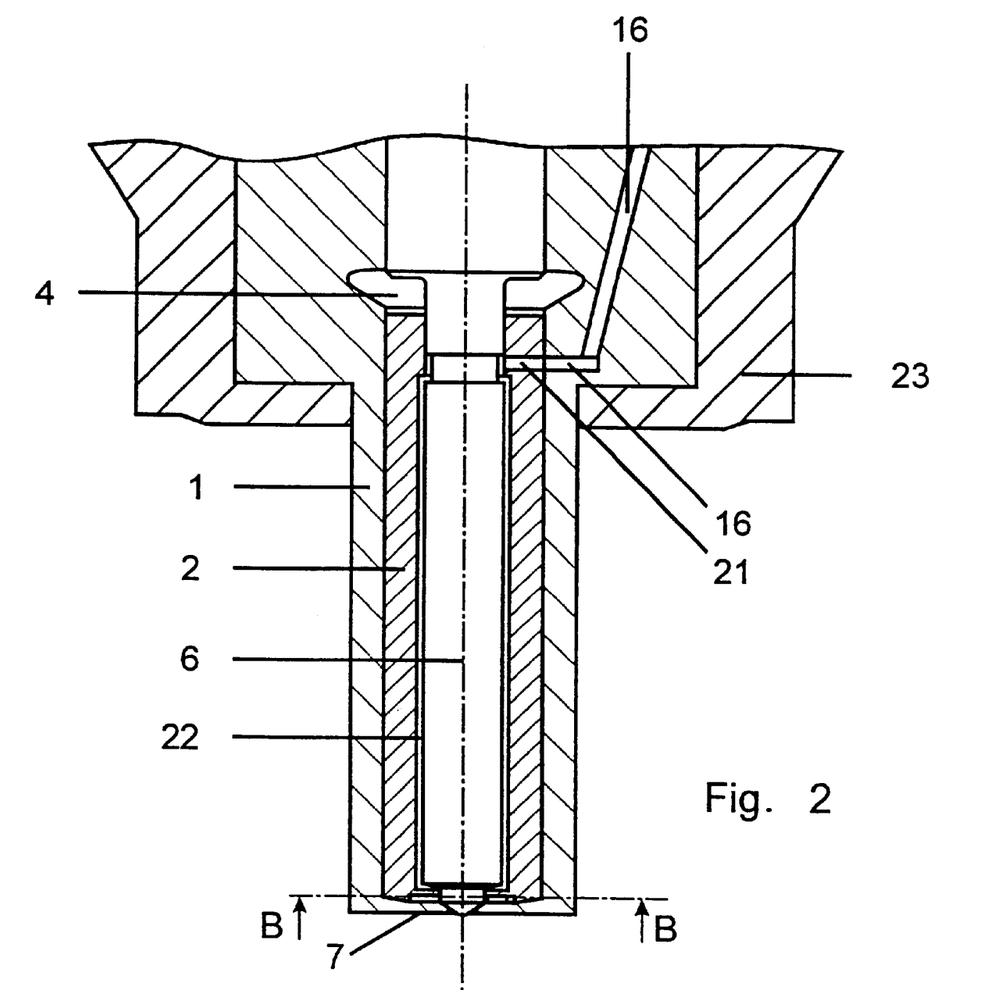
Figure 3:
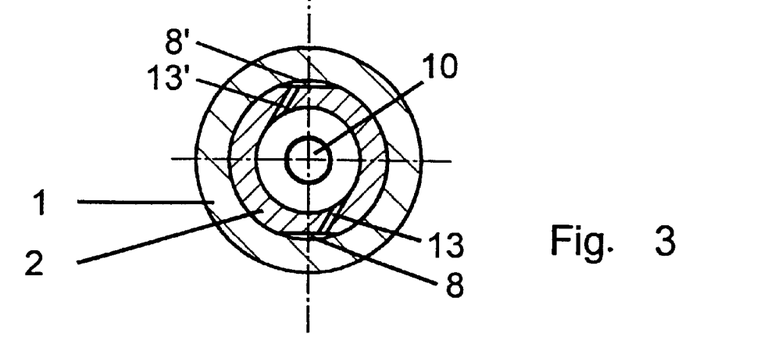
Figure 4:
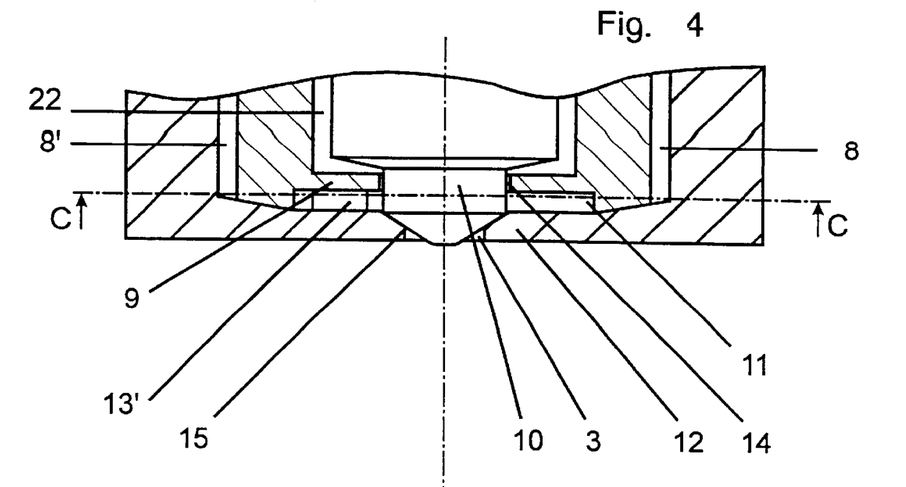
Figure 5:
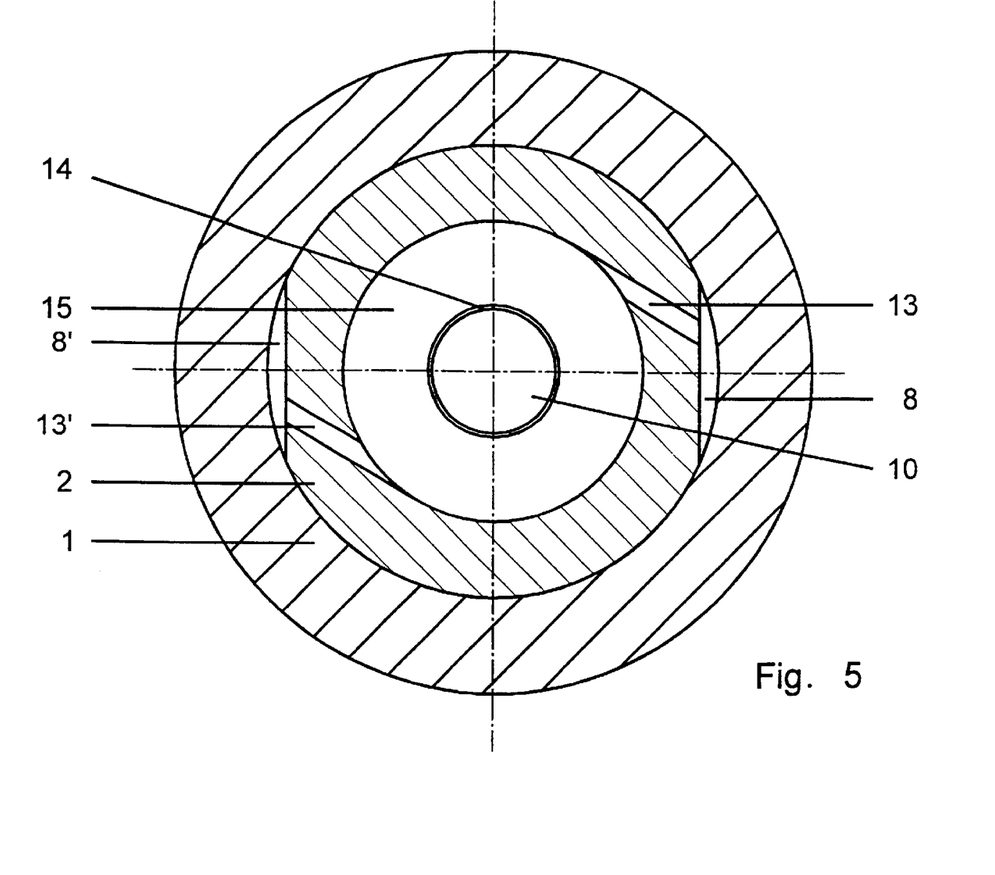

FIG. 1 shows an injection nozzle for a pump-nozzle system of a fuel injection device for an internal combustion engine. The injection nozzle consists of a nozzle body 1, which exhibits an axial through hole, into which a sleeve 2 is rigidly inserted. The outlet-side face 7 of the nozzle body 1 has the conical nozzle outlet opening 3, which can be sealed by the axially movable valve needle 6 located in the sleeve 2 and nozzle body 1, and is incorporated in the annular shoulder 12 of the nozzle body 1 (FIG. 4). The sleeve 2 extends from the outlet-side end of the nozzle body 1 to the rotationally symmetric pressure chamber 4 incorporated into the nozzle body 1. This chamber is connected with the fuel supply system via a channel 5. Incorporated into the outside wall of the sleeve 2 rigidly inserted into the nozzle body 1 are two opposing channels 8, 8', which exhibit the same cross-sectional area and extend over the entire length of the sleeve 2. At the outlet-side end, the sleeve 2 has an inner shoulder 9 with a hole for the journal 10 of the valve needle 6, and a rotationally symmetrical swirl chamber 11 adjacent thereto, which is formed around the journal 10 of the valve needle 6 (FIG. 4). The outlet-side end of the sleeve 2 securely abuts the annular shoulder 12 of the nozzle body 1. The swirl chamber 11 is connected with the channels 8, 8' for fuel supply via tangentially running supply channels 13, 13' (FIG. 5). The hole in the shoulder 9 of the sleeve 2 is slightly larger than the outside diameter of the journal 10 of the valve needle 6 routed into this hole in an axially moveable manner, so that the annular gap 14 formed as a result serves as a reflux opening for the fuel if the nozzle outlet opening 3 is sealed by the spring-mounted valve needle 6 with the end-side conical nipple 15. The axially moveable valve needle 6 in the sleeve 2 and the inside diameter of the sleeve 2 are adjusted to each other in such a way that the fuel flowing off through the annular gap 14 can get to the discharge channel 16 incorporated in the nozzle body 2 without any problem (FIG. 2). In addition to the journal 10 with the conical nipple 16, the valve needle 6 consists of two sections 17, 18 of varying diameter. The top section 17 of the valve needle 6, which interacts with the stud not shown in any greater detail here, exhibits a larger outside diameter than the lower section 18 attached thereto (FIG. 1 and FIG. 2). With the nozzle outlet opening 3 closed, the top section 17 extends through the valve needle 6 up to the pressure chamber 4, and forms a pressure shoulder 19, to which the narrowed section 18 then connects. Incorporated into the top part of this section 18 is an annular groove 20, which is connected to the discharge channel 16 with the valve needle 6 closed via a radial hole 21. With the valve needle 6 open, the radial hole 21 can be partially or completely sealed by the tight fit of the valve needle 6 in this area. The section 18 of the valve needle 6 is routed into the sleeve 2 with a tight fit above the radial hole 21. An annular chamber 22 is formed below the radial hole 21, between the section 18 of the valve needle 6 and the sleeve 2, via an enlargement of the inside diameter of the sleeve 2. With the valve needle 6 closed, the fuel in the swirl chamber 11 gets into the annular chamber 22 via the gap 14, and into the discharge channel 16 via the radial hole 21 (FIG. 2).

Fuel is supplied via the channel 5 and the pressure chamber 4 into the two channels 8 and 8', and from there into the swirl chamber 11 via the tangential supply channels 13 and 13' (FIG. 1, FIG. 4 and FIG. 5). As the fuel enters the swirl chamber, a swirl flow directed toward the axis of the valve needle forms therein. Since the spring-mounted valve needle 7 keeps the nozzle outlet opening 3 closed, the fuel rotating in the swirl chamber 11 flows back into the discharge channel, as already described above. The fuel pump elevates the rate of flow, and hence the pressure of the fuel inside the pressure chamber 4 increases as well. The increased pressure acts on the pressure shoulders 19 of the valve needle 6, and overcomes the spring resistance of the valve needle 6, so that the valve needle 6 lifts up, and releases the nozzle outlet opening 3. By lifting up, the valve needle 6 seals the hole 21 in the sleeve 2.

The fuel can now no longer get into the discharge channel from the swirl chamber, but rather passes through the nozzle outlet opening 3 into the combustion chamber of the internal combustion engine, becoming atomized in the process. If the pressure in the pressure chamber 4 drops again, the spring resistance presses the valve needle 6 with the conical nipple 15 into the nozzle outlet opening 3, and seals the latter. In this case, the radial hole 21 in the sleeve 2 is again released, and, while being conveyed through the pump, the fuel can again flow out of the swirl chamber 11 through the annular gap 14 and annular chamber 22, the hole 21 and the discharge channel 16.

Figure 8:
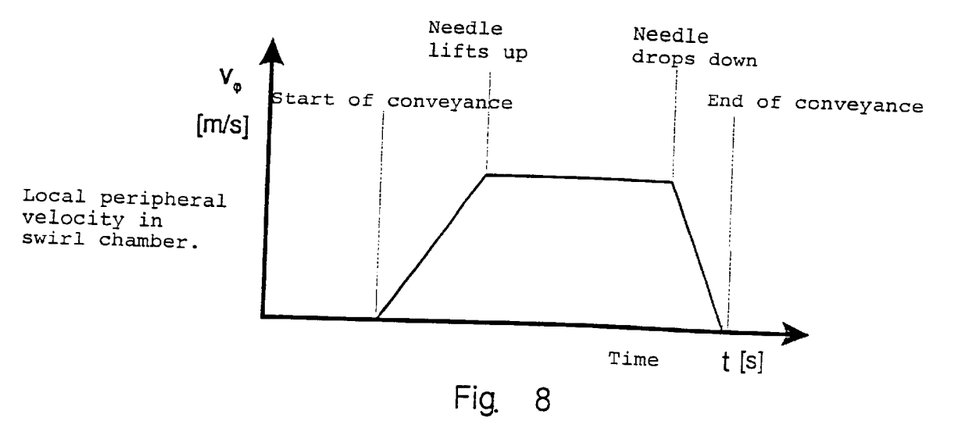

FIG. 8 shows the chronological progression of the individual phases between the point where pump conveyance begins and ends.

The peripheral velocity of the fuel in the swirl chamber continuously rises after conveyance begins without any atomization.

As evident from the diagram, a phase in which the peripheral velocity is zero, or no conveyance takes place, comes before conveyance begins. Therefore, the fuel is preferably introduced into the swirl chamber only shortly before the valve starts to open, and not already during the entire phase of the closed nozzle outlet opening.

As the valve needle lifts up, the peripheral velocity remains the same. Therefore, the peripheral velocity favorable for atomization already exists when the valve needle is opened. As the pressure drops, fuel conveyance decreases again. In this case, the valve needle is already closed again, so that the fuel is conveyed via the discharge channel if the pressure is too low.

To limit the pressure rise of the fuel, and hence the rise in peripheral velocity in the swirl chamber 11, the pressure chamber 4 can be connected with additional discharge channels. The nozzle body 1 is secured to the retainer body (not shown) of the fuel injection device in a manner known in the art using a union nut 23.

Figure 17:
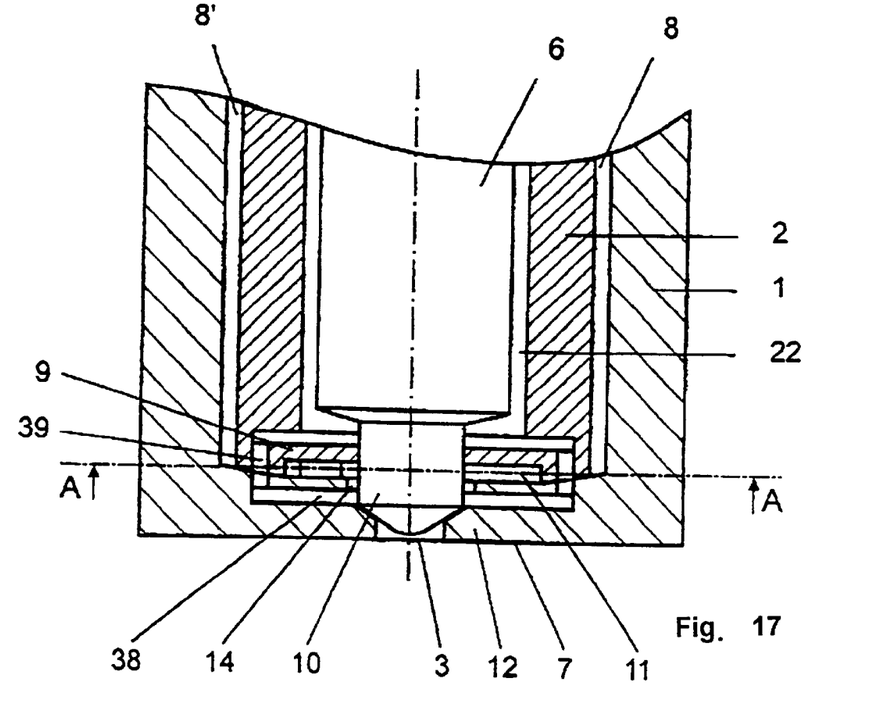
Figure 18:
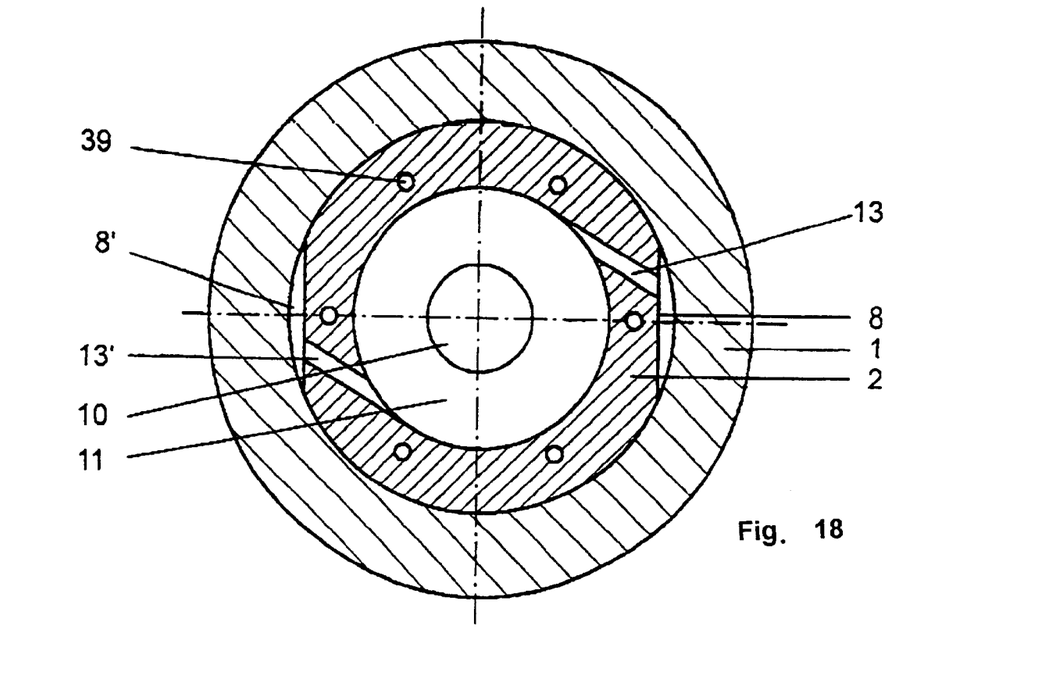

FIG. 17 and 18 show another way to remove the fuel from the swirl chamber 11. In comparison to the previously described fuel removal system, the fuel flow to be removed is not deflected by 180° in an axial direction, but rather removed concentrically directly around the valve needle 6. As a result, a very high atomization quality is achieved for the fuel right at the beginning of the injection process already. As shown in FIG. 17 and 18, an annular channel 14 running in the injection direction is incorporated in the annular shoulder 12 of the nozzle body 1 around the journal 10 of the valve needle 6, enabling a connection between the swirl chamber 11 and the downstream annular chamber 38. This chamber is arranged directly in front of the mouth of the nozzle opening 3, concentrically around the journal 10 of the valve needle 6. The annular chamber 38 is located at a relatively small parallel distance from the swirl chamber 11, and has the same height as the swirl chamber 11, but its diameter is larger than the swirl chamber 11. Arranged at the largest point of the radius of the annular chamber 38 around the periphery are six through holes 39, which extend from the annular chamber 38 through the annular shoulder 12 and the section 9 of the sleeve 2, and are connected with the annular channel 22, to enable the removal of the fuel from the annular chamber 38 in the storage tank.

This potential configuration functions as follows:

During the release of the fuel supply, the nozzle outlet opening 3 is sealed by the journal 10 of the valve needle 6. The fuel flows through the channel 8, 8' and 13, 13' into the swirl chamber 11, and is made to rotate therein, flowing in the direction of the journal 10 of the valve needle. In this case, there is a considerable increase in the swirl velocity of the fuel stream, which peaks directly at the journal 10. Due to the sealed nozzle outlet opening 3, the fuel flows from the swirl chamber 11 via the annular channel 14 running in the injection direction and into the annular chamber 38, in which the swirl velocity is reduced. The fuel flows out of the annular chamber 38 via the through holes 39 in the opposite direction to the injection direction in the annular channel 22, and from there into the storage tank in a manner known in the art. If the injection process is initiated by lifting the valve needle 6, the fuel removal is interrupted at the same time. The fuel flow located immediately around the journal 10 of the valve needle 6 rotates around the latter at a very high velocity, with the direction of flow directed toward the nozzle outlet opening 3. Therefore, an optimal atomization quality of the fuel is already achieved when opening the valve needle. During the subsequent closing of the nozzle outlet opening 3 via the journal 10 of the valve needle 6, the path is simultaneously released once again for fuel removal. The high rotational velocity of the fuel around the journal 10 of the valve needle 6 is retained until the nozzle outlet opening is again closed. Hence, a constantly high atomization quality is always achieved during the injection process.

Figure 6:
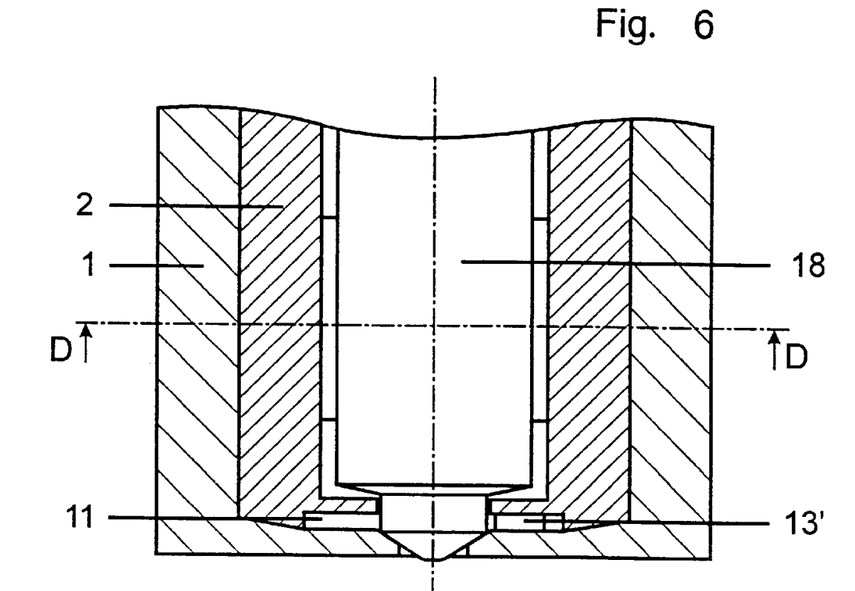
Figure 7:
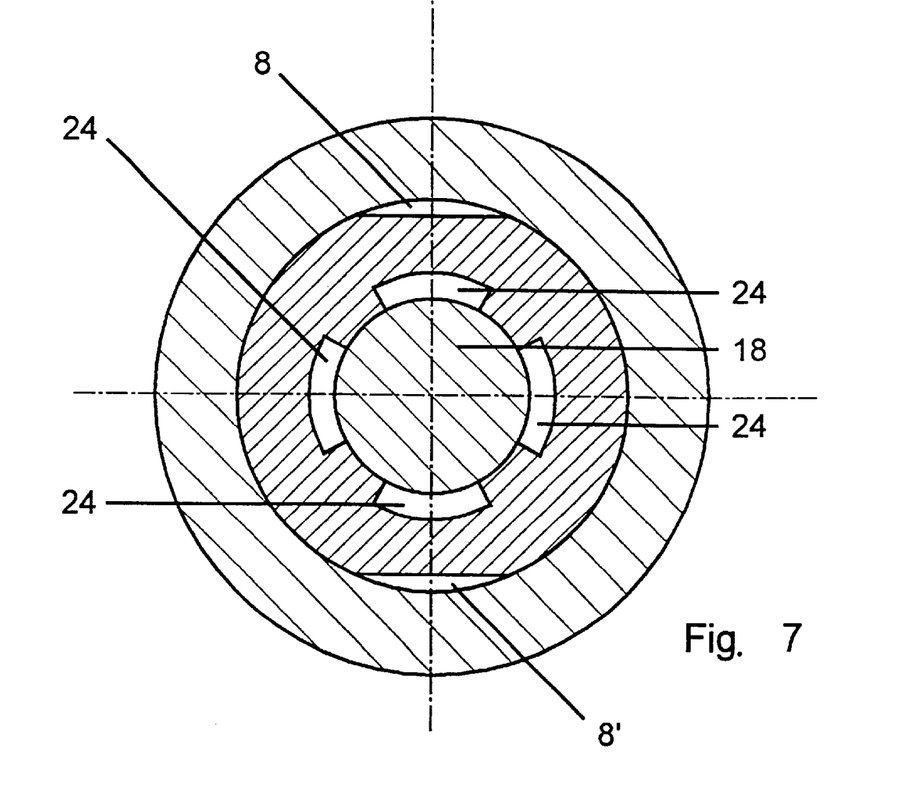

FIGS. 6 and 7 show another potential configuration for removing the fuel from the swirl chamber 11 in the area of the section 18 of the valve needle 6 and the sleeve 2.

Figure 9:
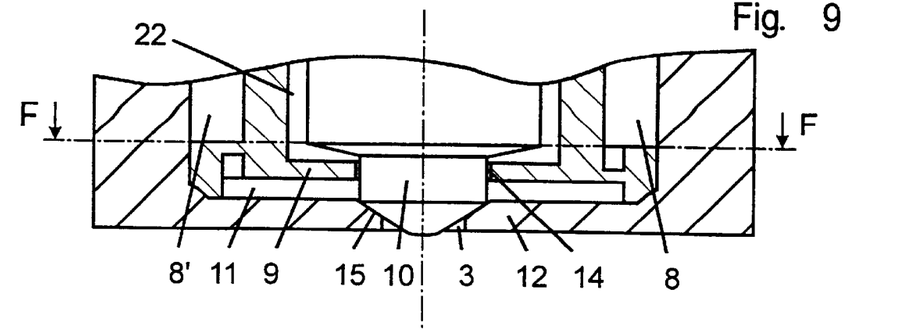
Figure 10:
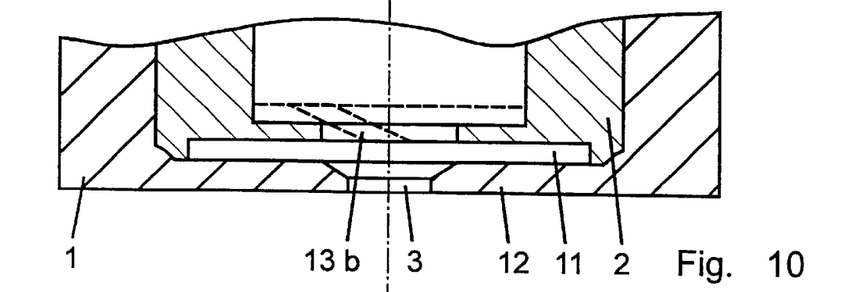
Figure 11:
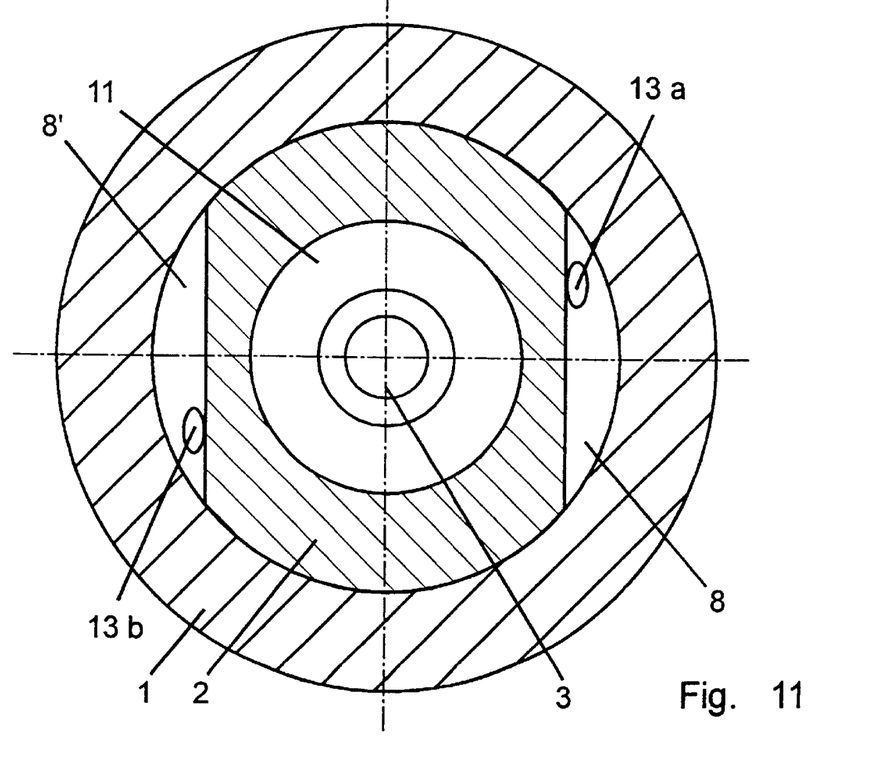

The depicted section 18 of the valve needle 6 fits tightly against the inside surface of the sleeve 2, and four groove-shaped channels 24 are incorporated in the wall of the sleeve 2, through which the fuel gets into the upper annular groove 20, and from there into the discharge channel 16 via the radial hole 21. In comparison to the configuration shown in FIG. 1 to 5, four groove-shaped channels 24 are arranged in place of the annular space 22 shown there, wherein two channels 24 are opposite each other. Otherwise, the configuration shown in FIG. 6 and 7 is similarly laid out as the potential configuration depicted in FIG. 1 to 5. FIG. 9 to 11 show another potential configuration, in which the supply channels 13a and 13b emptying out into the swirl chamber 11 are not designed as a tangential channel as opposed to the potential configurations in FIG. 1 to 5, but as an inclined channel running from top to bottom. The channels 13a and 13b start above the swirl chamber 11, pass through the holes introduced in the sleeve 2 and run downward at an inclination up to the swirl chamber 11. The fuel starts from the vertical channels 8, 8' and flows through the inclined channels 13a and 13b into the swirl chamber 11, wherein these channels progress in such a way as to even trigger the necessary rotation of the fuel in the swirl chamber.

Figure 12:
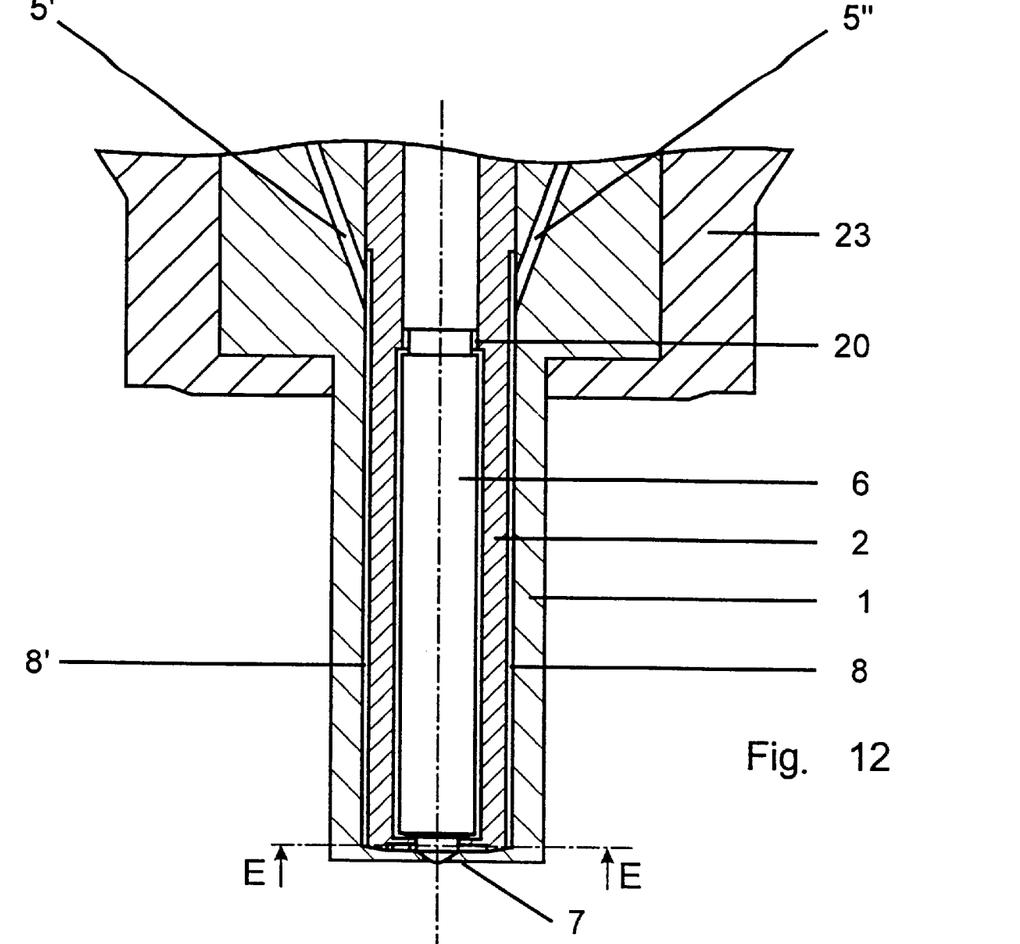
Figure 13:
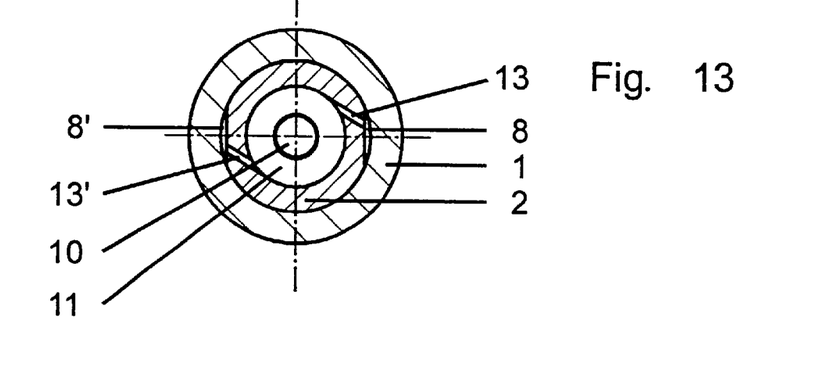
Figure 14:
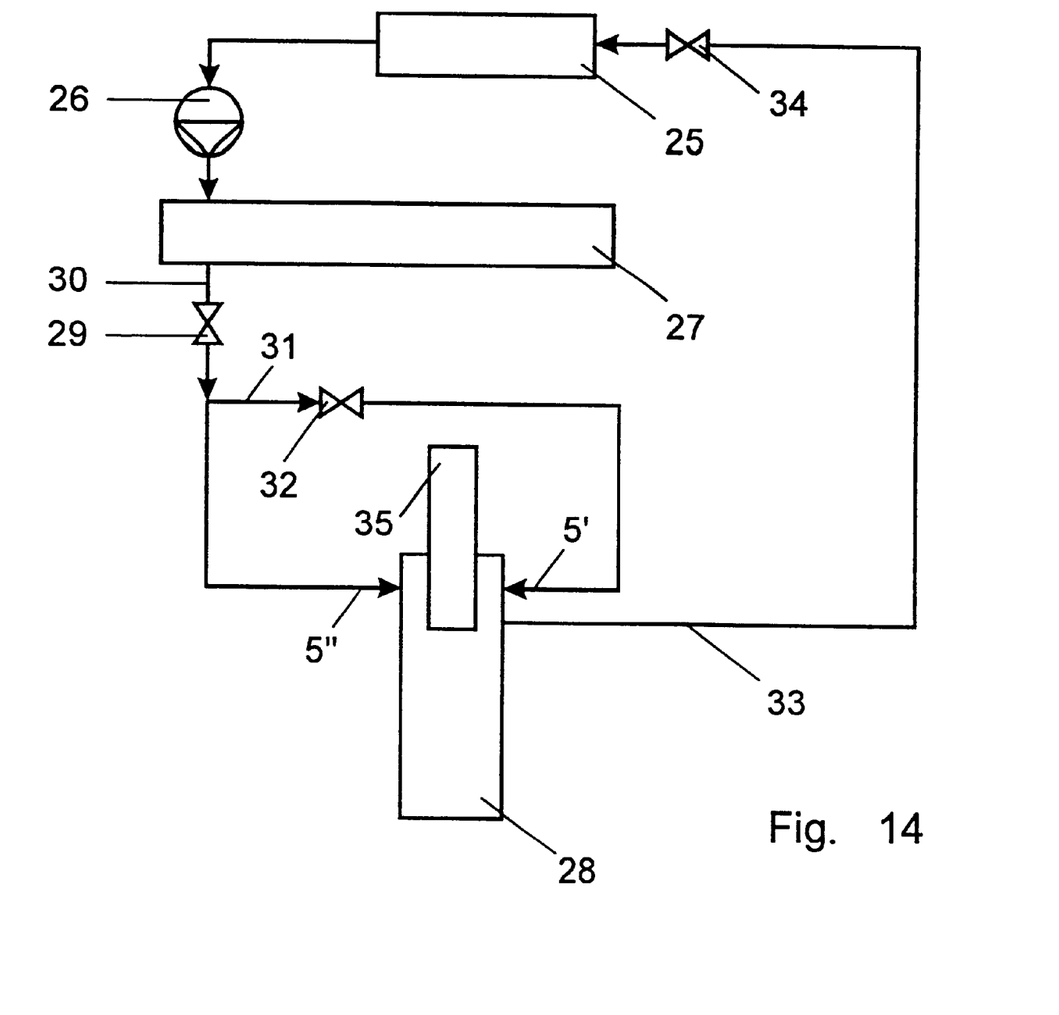

FIGS. 12 to 14 show another configuration of an injection nozzle according to the invention for a common-rail system. In the common-rail system, the fuel is passed to one or more electromagnetically controlled injection nozzles via a supply line acting as an accumulator under high pressure. Since the maximal pressure is always applied in the overall system, the droplet size and jet properties are independent of velocity. The outlet-side structure of the nozzle according to FIGS. 12 and 13 is similar to the one already shown in FIGS. 1 to 5.

The essential difference relative to the configuration shown in FIGS. 1 to 5 is that no pressure chamber is provided, and the valve needle 6 has the same outside diameter above the radial hole (item 22 in FIG. 2) as below this hole, since a pressure shoulder is no longer required given the absent pressure chamber.

The fuel is supplied via two separate channels 5' and 5" in the nozzle body 1, which are incorporated into the corresponding axial channels 8, 8' on the outside periphery in the sleeve 2. The fuel flows through these channels, and is routed into the swirl chamber 11 via the tangentially running supply channels 13 and 13'. The valve needle 6 is correspondingly controlled in a known manner using a piezoelectric system.

The procedural principle is explained in conjunction with a fuel pressure-independent control system based on the operational diagram shown in FIG. 14. In the common-rail system, fuel is supplied to the injection nozzle(s) 28 via a supply line acting as an accumulator 27 from a fuel container 25 by means of a high-pressure pump 26 built into the system of lines. A valve 29 through which the fuel flow is time-released to the nozzle ties into the supply line 30. A branch line 31 incorporating another control valve 32, e.g., a butterfly valve known in the art, is built into the supply line after the valve 29. The two lines 30 and 31 are connected with the fuel lines 5' and 5'of the injection nozzle 28, wherein a piezoceramic system 35 is present to release the nozzle outlet opening. As already explained in detail, the fuel flows into the swirl chamber 11 of the nozzle, and with the nozzle outlet opening closed, back into the fuel container 25 via the discharge channel and reflux line 33 connected thereto. The valve 34 built into the reflux line 33 is closed at the same time the nozzle outlet opening is released by lifting up the valve needle. As already explained, the fuel rotates in the swirl chamber before it gets into the combustion chamber of the internal combustion engine on release of the nozzle outlet opening, and is atomized in the process. The control valve 32 built into the branch line 31 can also affect the atomized fuel quantity. Depending on the requirements (e.g., depending on the engine speed), the control valve can be adjusted to various settings, thereby influencing the fuel flow rate. In one borderline case, the amount of fuel only gets through a system of channels or lines 30, 5" an d8' into the swirl chamber with the control valve 32 closed. The other borderline case, where the control valve 32 is completely open, makes it possible to supply a significantly larger fuel quantity into the swirl chamber. As a result, this control valve can be used to vary the fuel quantity to be introduced into the swirl chamber given an identical preliminary pressure.

Figure 15:
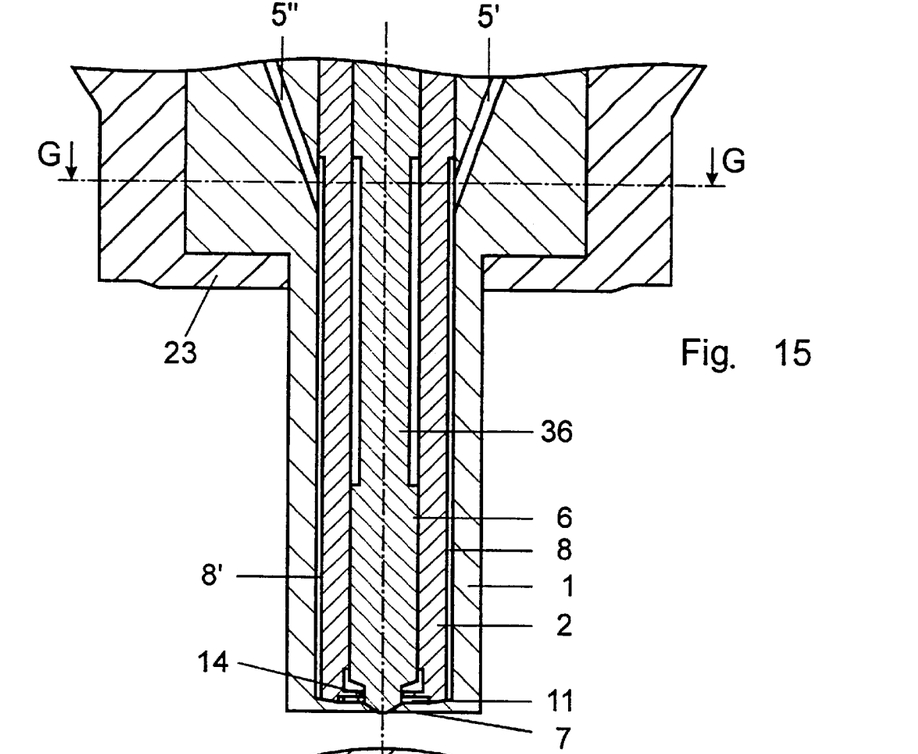
Figure 16:
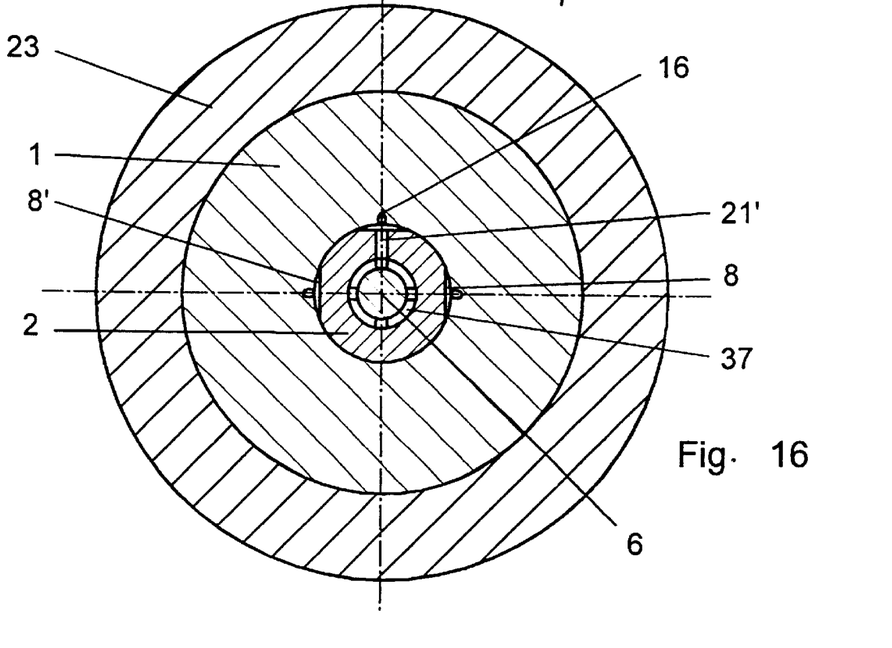

FIGS. 15 and 16 show another configuration of an injection nozzle for the common-rail system, which differs from the configuration shown in FIG. 12 and 13 only in that the reflux flow for the fuel is designed differently inside the nozzle.

The inside of the sleeve 2 exhibits a smooth surface. The necessary axial channels for returning the fuel from the swirl chamber 11 to the hole 21' in the sleeve 2 are incorporated exclusively in the valve needle 6. In the upper part, proceeding from radial hole 21', the valve needle 6 has an area 36 that is machine-faced on the outside periphery, which forms an annular chamber between the inside of the sleeve 2 and the valve needle 6. This chamber extends only over a certain partial area of the valve needle 6. The additional axial connection to the swirl chamber 11 takes place via axial grooves 37 in the valve needle incorporated subsequent to the machine-faced area 36. The area of the grooves 37 should be long enough to still ensure a sufficient routing of the valve needle 6 into the sleeve 2. The annular chamber 36 in the upper part of the valve needle 6 passes directly over to the grooves 37 in the lower part. Proceeding from the swirl chamber, the fuel then proceeds through the annular gap 14 via the grooves 37 into the annular chamber 36, and into the discharge channel 16 via the hole 21' in the sleeve 2. The advantage to this solution lies in a very low manufacturing outlay for the sleeve and valve needle.

Accordingly, while only a few embodiments of the present invention have been shown and described, it is obvious that many changes and modifications may be made thereunto without departing from the spirit and scope of the invention.

What is claimed is:

1. A method of injecting fuel into the combustion chamber of an internal combustion engine using a swirl injection nozzle having an axially moveable valve needle, comprising the steps of:
   rotating pressurized fuel around the valve needle via several inlet openings into an annular swirl chamber (11) at an area where said swirl chamber (11) has the largest radius, wherein the fuel is introduced with varying partial fuel quantities;
   directing a radial velocity component towards the axis of said swirl chamber (11) into the fuel flow while a nozzle outlet opening (3) is closed; and
   removing the fuel flow from said swirl chamber (11) concentrically to the valve needle at an area where said swirl chamber (11) has the smallest radius.

2. The method according to claim 1, wherein said inlet openings in the swirl chamber (11) vary in their cross-sectional surfaces.

3. The procedure according to claim 1, characterized by the fact that the individual partial fuel quantities are supplied at varying times determined by a controller.

4. The method according to claim 1, wherein the motion of the valve needle for opening and closing the nozzle outlet opening is controlled in stages.

5. The method according to claim 1, wherein during the time for which the nozzle outlet opening is closed, the fuel flow removed concentrically to the valve needle where the radius of the swirl chamber is smallest flows in the injection direction while retaining its rotational motion, is radially removed before reaching the nozzle outlet opening and subsequently returned to the storage tank moving against the injection direction.

6. The method according to claim 1, wherein the removal of fuel from the swirl chamber is controlled by a valve built into the reflux line.

7. The method according to claim 6, wherein the removal of fuel from the swirl chamber is divided into varying partial reflux quantities in phases.

8. The method according to claim 1, wherein the respective partial quantities of the supplied fuel and fuel removed from the swirl chamber are used as a variable for controlling various target parameters.

9. The method according to claim 8, wherein exhaust gas quality is determined as a target parameter.

10. A injection nozzle, in particular for executing the procedure according to claim 1, consisting of a nozzle body (1) with a nozzle outlet opening (3) and a guide for an axially movable valve needle (6, 10), along with at least one channel for supplying the fuel to an annular swirl chamber (11) situated directly in front of the nozzle outlet opening (3) around the valve needle (6, 10) and at least one channel for removing the fuel from the swirl chamber (11), wherein the outside diameter of the swirl chamber (11) exceeds the height of the swirl chamber (11), and the channel (14) for removing the fuel from the swirl chamber (11) is arranged concentrically around the valve needle (6, 10), characterized by the fact that several supply channels (8, 8', 13, 13', 13a, 13b, 30, 31) are provided for supplying he fuel, of which at least one can be blocked.

11. An injection nozzle for injecting fuel into the combustion chamber of an internal combustion engine, comprising:
   a nozzle body (1);
   a nozzle outlet opening (3) disposed on said nozzle body;
   a guide for an axially moveable valve needle;
   several channels for supplying the fuel into an annular swirl chamber (11) being disposed directly in front of said nozzle outlet, wherein at least one of said several channels can be blocked; and
   at least one channel for removing the fuel from said swirl chamber (11) arranged concentrically around said valve needle.

12. The injection nozzle according to claim 11, wherein said channel (14) for removing the fuel is connected with groove-shaped channels (24) arranged between a sleeve (2) and the valve needle (6).

13. The injection nozzle according to claim 12, wherein the height of the swirl chamber (11) does not exceed the largest diameter of the supply channels (13, 13', 13a, 13b) incorporated in said sleeve (2) by more than 10%.

14. The injection nozzle according to claim 12, wherein a top end of said sleeve (2) has a radial hole (21, 21') that is connected with a discharge channel (16) arranged in the nozzle body (19).

15. The injection nozzle according to claim 14, wherein the radial hole (21) is sealed by the valve needle (6).

16. The injection nozzle according to claim 15, wherein the channels (13, 13', 13a, 13b) in the sleeve (2) exhibit varying cross sections.

17. The injection nozzle according to claim 11, wherein the channel (14) for removing the fuel from the swirl chamber (11) runs in the injection direction, and empties out into a drain (38) situated radially in front of the nozzle outlet opening (3), wherein this drain is connected with channels (39) that run against the injection direction and empty out in an annular chamber (38) for removing the fuel.

18. The injection nozzle according to claim 17, wherein the drain is designed as a annular chamber (38) with a greater diameter than the swirl chamber (11).

19. The injection nozzle according to claim 17, wherein the channels (39) running opposite the injection direction are arranged on the periphery where the radius of said annular chamber (38) is largest.

20. The injection nozzle according to claim 17, wherein said annular chamber (38) is not higher than the height of the swirl chamber (11).

21. The injection nozzle according to claim 17, wherein said annular chamber (38) is arranged at a slight distance from the swirl chamber (11).

22. The injection nozzle according to claim 17, wherein said annular chamber (38) is incorporated into the sleeve (2) or the inlet-side area of the nozzle body (1), or into both components (38, 1).

23. The injection nozzle according to claim 11, wherein the nozzle is incorporated into a common-rail system, wherein a valve (29) for the time-release supply of fuel is arranged in a supply line (30) acting as an accumulator, and a branch line (31) that accommodates another control valve (32) is incorporated into the supply line (30) after the valve (29), and the two lines (30, 31) are connected with the fuel supply lines (5, 5") of the injection nozzle (28).

\* \* \* \* \*